United States Patent [19]

Warrick

[11] Patent Number: 4,712,834

[45] Date of Patent: Dec. 15, 1987

[54] ADJUSTABLE SEAT CUSHION WITH TENSION LIMITING MEANS

[75] Inventor: James C. Warrick, Tempe, Ariz.

[73] Assignee: Simula, Inc., Phoenix, Ariz.

[21] Appl. No.: 943,169

[22] Filed: Dec. 18, 1986

[51] Int. Cl.[4] .................. A47C 7/14; B64D 11/06; B64D 25/04

[52] U.S. Cl. .................. 297/284; 244/122 R; 297/216

[58] Field of Search .............. 297/216, 284, 452, 458; 244/122 R, 122 A, 122 AG

[56] References Cited

U.S. PATENT DOCUMENTS

| | | | |
|---|---|---|---|
| 280,004 | 6/1883 | Bakewell | 297/284 X |
| 1,182,854 | 5/1916 | Poler | 297/284 |
| 2,692,010 | 10/1954 | Christie | 297/284 |
| 3,178,221 | 4/1965 | Schwartz | 297/284 |
| 3,208,794 | 9/1965 | Gunn | 297/284 X |
| 3,273,877 | 9/1966 | Geller et al. | 297/284 |
| 4,462,635 | 7/1984 | Lance | 297/452 X |

FOREIGN PATENT DOCUMENTS

| | | | |
|---|---|---|---|
| 1523303 | 8/1978 | United Kingdom | 297/216 |
| 929474 | 5/1982 | U.S.S.R. | 297/452 |

Primary Examiner—Kenneth J. Dorner
Assistant Examiner—Peter R. Brown
Attorney, Agent, or Firm—Herbert E. Haynes, Jr.

[57] ABSTRACT

A bottom cushion for use in a seat of the type used in situations where an occupant could be subjected to spine damaging injury resulting from rapid vertical acceleration or deceleration. The seat cushion includes a frame mounted above the rigid seat pan of the seat with an air-permeable, flexible membrane suspendingly carried in the frame. The seat cushion is provided with a membrane adjusting mechanism by which an occupant applies tension to the membrane to lift his or her posterior above the seat pan for comfort reasons, and has a vertical displacement limiting mechanism which for safety reasons prevents the occupant from lifting the membrane and his or her posterior an excessive distance above the set pan.

20 Claims, 4 Drawing Figures

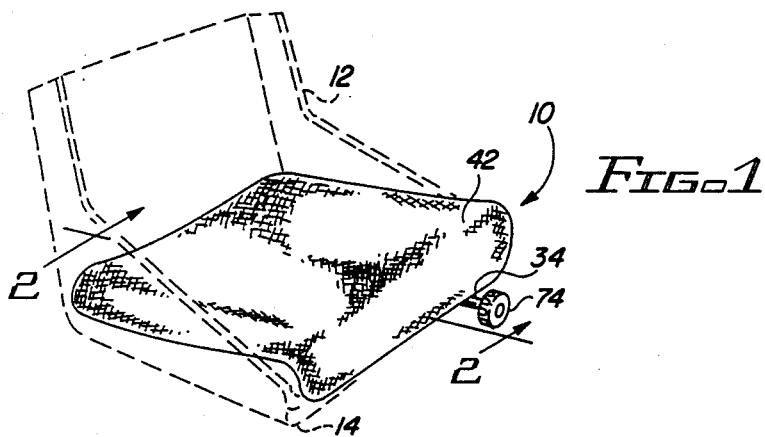
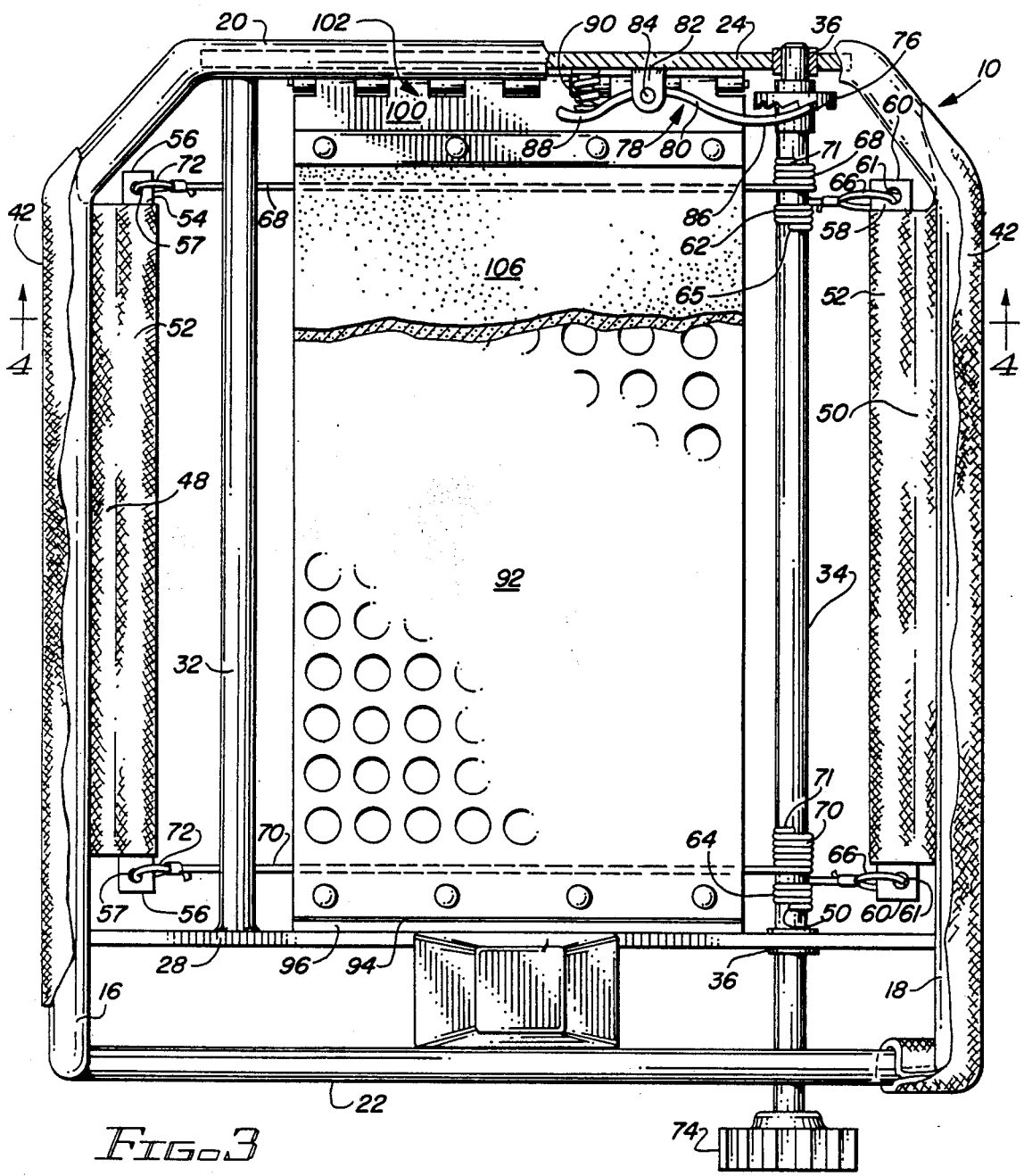

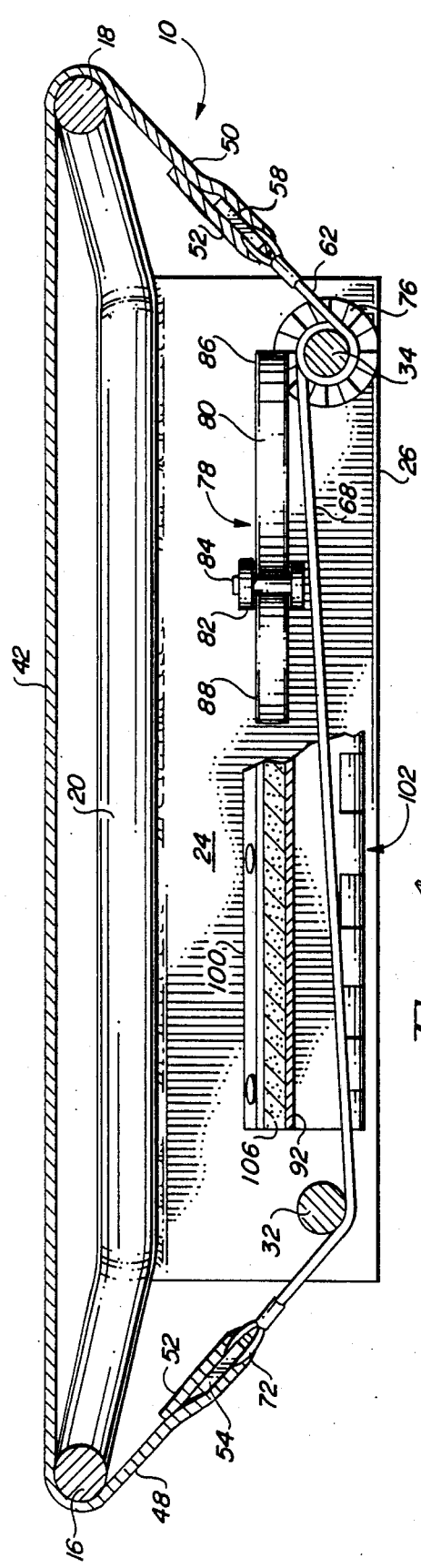
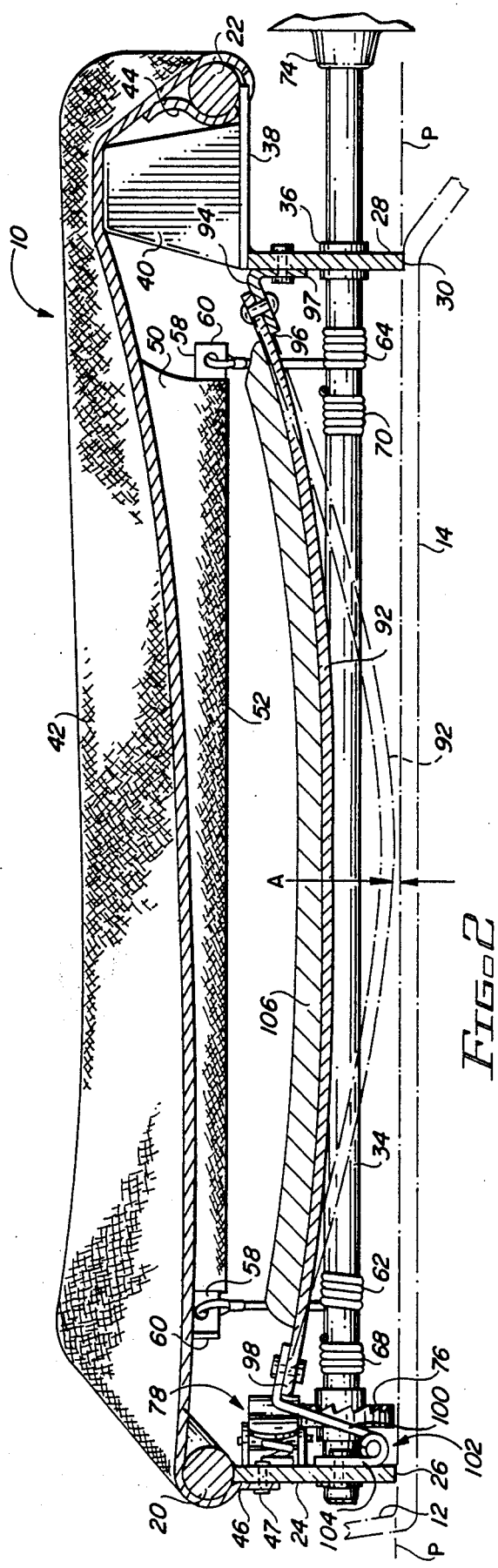

ADJUSTABLE SEAT CUSHION WITH TENSION LIMITING MEANS

This invention was made with Government support under contract DAAK51-84-C0008 awarded by the Department of the Army. The Government has certain rights in this invention.

BACKGROUND OF THE INVENTION

1. Field of the Invention

This invention relates in general to seat cushions and more specifically to an adjustable seat cushion having tension limiting means for protecting an occupant in the event of vertical vehicular crashes, rocket-assisted ejection from an aircraft and the like.

2. Description of the Prior Art

As is well known in the art, the human body has a relatively low tolerance to compressive loads in the spine. Because of this, special seating systems have been devised and are required in some instances where compressive loading of the spine can be expected, such as in crashworthy helicopter seats, ejection seats of fighter aircraft, and the like.

Two basic factors must be considered when designing such a special seating system, and those two factors are safety and comfort. All seats used in the cases discussed above, i.e. helicopter seats, aircraft ejection seats, and the like, include among other things, a rigid seat pan. For comfort considerations an occupant cannot sit directly on the seat pan for very long. Thus, it is a common prior art practice to interpose some sort of a cushion between the seat pan and the occupant's buttocks.

Whenever the occupant's buttocks is displaced relative to the seat pan, such as by a cushioning structure, the effects of vertical acceleration and/or deceleration come into play. More specifically, in the case of vertical acceleration, such as in an ejection seat, the seat pan will accelerate more rapidly than the occupant and can reach spine damaging velocities by the time it impacts the occupant's buttocks if displacement of the occupant's buttocks relative to the seat pan is excessive prior to the start of acceleration. Similarly, the occupant can crash down onto the seat pan which has been stopped as a result of abrupt vertical deceleration, such as in a helicopter crash.

Several prior art structures have been devised as compromised attempts to satisfy the mutually exclusive factors of safety and comfort which must be considered in seats of this type.

A first prior art attempt was to use a very thin or very compressible seat cushion which was very close to being completely flattened, or crushed, by the weight of the occupant under the influence of normal gravity. This was less than satisfactory in that the cushion had to be designed for an average occupant and thus could not take into account a wide range of occupant body variables such as weight, bone structure, buttock flesh, posture and the like. Even with an average occupant, comfort was lacking in all but very short sitting periods.

The use of the very thin or very compressible cushion was improved to a degree by using it in conjunction with a seat pan that is formed with a buttock contour. This second prior art seating system, which is currently used in many safety seating systems, distributes the load more uniformly but still suffers from the same drawbacks as the first prior art system in that both the cushion and the contoured seat pan must be designed for an average occupant.

Another prior art attempt at solving the safety seat problem is to make a cushion out of a material which may be referred to as a rate-sensitive material, that is, one that behaves rigidly during rapid acceleration and deceleration, and is readily deformed in normal use. Examples of such materials which have been tried with various degrees of success, are rate-sensitive upholstery foams whose stiffness depends on the rate of compression, viscous fluids in bladders, viscous solid elastomeric materials, beads in bags and non-Newtonian fluids whose stiffness increases dramatically with the shear rate. Seat cushions formed of some of the rate-sensitive materials mentioned above have been judged by some users to be comfortable, but only the non-Newtonial fluid has demonstrated truly rigid behavior in resisting abrupt displacement. Dynamic test data on rate-sensitive materials per se has typically been obtained under nonrepresentative conditions and because of this, there is reason to suspect the use of such materials in safety seating systems. In addition, cushions made of rate-sensitive materials tend to be heavy and lack ventilation capabilities and thus require the use of an additional ventilation cushion or layer.

Still another prior art attempt has been made to solve this safety seat problem by using what is referred to as a diaphragm-type seat cushion. A diaphragm-type cushion is one which supports the occupant on a stretched membrane of net material, fabric or an elastomeric sheet. This approach has not proven to be satisfactory for several reasons. If the diaphragm is formed of a stiff material having little or no buttock conforming capability, then it can be suspended reasonably close to the seat pan for safety reasons. However, the stiff material will be about as comfortable as the thin and/or compressible cushion pad used on the contoured seat pan. On the other hand, if the diaphragm is formed of a flexible material having buttock conforming capabilities, it must be suspended quite high above the seat pan to provide sufficient room for the membrane to conform to the occupant's buttocks. The problem with this latter approach is that it is virtually impossible to determine a diaphragm suspension point which will be ideally suited for all occupant variables. That is, some occupants will displace the diaphragm more than others with the result being that some occupants will be sitting directly on the uncomfortable seat pan, while others will be suspended above the seat pan a distance which could damage their spines in the event of rapid vertical acceleration or deceleration.

Therefore, a need exists for a new improved seat cushion which overcomes some of the problems and shortcomings of the prior art.

SUMMARY OF THE INVENTION

In accordance with the present invention, a new and improved safety seat cushion is disclosed for use in situations where there is a possibility that an occupant of the seat will be subjected to rapid vertical acceleration or deceleration such as can occur in aircraft ejection seats, helicopters and the like. The seat cushion is of the type commonly referred to as a diaphragm-type cushion wherein a flexible membrane is suspended in the seat cushion.

The seat cushion is provided with a membrane tensioning means by which an occupant adjusts the tension on the membrane under normal one-gravity conditions so as to lift both the membrane and his or her buttocks off of the seat pan in which the cushion is supported. When such an adjustment has been made, the occupant's buttock load will be evenly distributed by the membrane whose flexibility causes it to conform to the occupant's buttocks and thereby avoid uncomfortable high pressure points. Due to the adjustable membrane tensioning means, the membrane tension can be set to whatever amount of tension is needed to accomplish this objective for various occupants regardless of physical characteristics.

The seat cushion of the present invention is also provided with a vertical displacement limiting means which cooperates with the membrane tensioning means to limit the vertical displacement of the membrane relative to the seat pan to a safe value. As hereinbefore described, the abrupt vertical acceleration of a seat and its occupant must be considered when designing a seat cushion so that a small distance between the occupant's buttocks and the rigid seat pan is maintained such that a large relative velocity does not build up prior to the impacting of the seat pan against the occupant's spine. High impact velocity of the seat pan against the occupant's buttocks is known to have spine-damaging consequences. The vertical displacement limiting means provides a safeguard against the occupant's adjusting the membrane more than is needed to raise the membrane, and of course his or her buttocks, beyond a safe distance relative to the rigid seat pan in which the seat cushion of the present invention is supported. The small distance ensures that seat pan-occupant impact occurs at a low relative velocity.

In addition to the safety and comfort advantages provided by the seat cushion of the present invention, the membrane is preferably formed of an air-permeable material for ventilation purposes, is lightweight and thus ideally suited for aircraft use and may be easily cleansed. The inherent characteristics of a diaphragm-type seat cushion results in the occupant being isolated from vehicular vibrations, and the seat cushion may be fabricated of non-toxic, fire resistant and chemical resistant materials.

Accordingly, it is an object of the present invention to provide a new and improved seat cushion structure which is ideally suited for use in seat systems of the type used whenever there is a possibility that the seat system and its occupant may be subjected to rapid vertical acceleration or deceleration.

Another object of the present invention is to provide a new and improved seat cushion of the diaphragm-type which provides both comfort and safety of the occupant regardless of the physical characteristics of the occupant.

Another object of the present invention is to provide a new and improved seat cushion of the above described character wherein the occupant is supported on a suspended flexible membrane, with the seat cushion including a membrane tensioning means by which the occupant adjusts the tension on the membrane so as to lift it and his or her buttocks off of the rigid seat pan in which the seat cushion is supported to provide the desired comfort.

Still another object of the present invention is to provide a new and improved seat cushion of the above described character which includes a vertical displacement limiting means which cooperates with the membrane tensioning means to limit the vertical displacement of the membrane and the occupant's buttocks to a predetermined safe distance above the seat pan of the seat structure.

The foregoing and other objects of the present invention as well as the invention itself may be more fully understood from the following description when read in conjunction with the accompanying drawings.

BRIEF DESCRIPTION OF THE DRAWINGS

FIG. 1 is a perspective view of the seat cushion of the present invention showing it in place within a typical seat structure.

FIG. 2 is an enlarged fragmentary sectional view taken along the line 2—2 of FIG. 1.

FIG. 3 is an enlarged plan view of the seat cushion of the present invention with portions being broken away to show the various features thereof.

FIG. 4 is a section view taken along the line 4—4 of FIG. 3.

DESCRIPTION OF THE PREFERRED EMBODIMENT

Referring more particularly to the drawings, FIG. 1 shows the seat cushion of the present invention which is indicated in its entirety by the reference numeral 10. The seat cushion 10 is shown as being supported in a typical seating structure 12 which is intended to be indicative of the various types of seating structures used is some types of aircraft installations such as an ejection seat of a fighter aircraft, a helicopter seat, and the like. Although such seating structures will vary in structural details, they all include a rigid seat pan 14 upon which a seat cushion is supported.

The seat cushion 10 of the present invention includes a frame of generally rectangular configuration formed by an opposed pair of side bars 16 and 18, a rear bar 20 and a downwardly off set front bar 22. The bars 16, 18, 20, and 22 are formed into a unitary rigid structure by techniques well known in the art.

A subframe is provided in the preferred form of a rear planar plate 24 which is attached such as by welding so as to depend from the rear bar 20 of the frame with the plate 24 having a linear bottom edge 26. The subframe also includes a front plate 28 also in planar form which is attached such as by welding so as to extend transversely between the side bars 16 and 18 of the frame at a point set back from the front bar 22 with the front plate 24 depending from the side bars and having a linear bottom edge 30. The rear and front plates 24 and 28 are in spaced apart parallel relationship with respect to each other and their bottom edges 26 and 30, respectively, lying in a plane P. For reasons which will become apparent as this description progresses, the plane P is coextensive with the upper surface of the seat pan 14 in which the seat cushion is supported as shown in FIG. 2.

As will hereinafter be described in detail, the frame further includes a fixed bar 32 which extends normally between the rear and front plates 24 and 28 at a location proximate the bottom edges 26 and 30 thereof. The fixed bar 32 is laterally off set with respect to the centers of the plates 24 and 28 toward the side bar 16 of the frame. A torsion bar 34 is similarly off set in the opposite direction toward the side bar 18 of the frame. The torsion bar 34 extends normally between the rear and front plates 24 and 28 and is journalled for rotation in suitable bushings 36 provided in those plates.

As seen best in FIG. 2, a plate 38 is suitably attached to the upper edge of the front plate 28 intermediate its opposite ends and extends forwardly to the front bar 22 of the frame. A semirigid bolster 40 in the form of a block is fixedly attached to the upper surface of the plate 38 so as to be upstanding therefrom. The bolster 40 is disposed so as to be positioned between the legs of an occupant (not shown) and to position a diaphragm-type membrane 42 well above the downwardly offset front bar 22 of the frame so that it will support the occupant's legs above and thus out of engagement with the front bar 22.

The diaphragm-type membrane 42 which is formed of a flexible material such as a net is suspendingly mounted in the frame and has its front edge attached to the front bar 22 of the frame such as by means of a folded back loop 44 which is suitably attached to itself by stitches, adhesive or the like. The rear edge 46 of the membrane 42 passes over the rear bar 20 of the frame and is attached to the back surface of the rear plate 24 in any suitable manner such as by rivets 47. The opposed edges 48 and 50 of the membrane are looped over the side bars 16 and 18, respectively, of the frame so as to be free of attachment to the side bars and are sewn or otherwise formed into elongated loops 52. The loop 52 of the side edge 48 has an elongated rod 54 disposed therein so that the opposite ends 56 of the rod extend oppositely from the loop 52 and each of those opposite ends 56 have an aperture 57 formed therethrough. An elongated rod 58 is similarly disposed in the loop 52 of the side edge 50 of the membrane 42 with the opposite ends 60 extending oppositely from the loop and having an aperture 61 formed through each of the ends 60.

A first pair of cables 62 and 64 have one of their ends attached to the torsion bar 34 as indicated at 65 in FIG. 3. The cables 62 and 64 are wound around the torsion bar in a windlass fashion and have loops 66 formed in their distal ends with the loops 66 passing through the apertures 61 of the opposite ends 60 of the rod 58. A second pair of cables 68 and 70 have one of their ends attached to the torsion bar 34 as indicated at 71, and those cables 68 and 70 are also wound around the torsion bar 34 in windlass fashion. The cables 68 and 70 extend from the torsion bar 34 and pass under the fixed bar 32 of the frame and have loops 72 formed on their distal ends for attachment of the cables to the apertured opposite ends 56 of the rod 54.

As shown, the second pair of cables 68 and 70 are wound around the torsion bar 34 in the opposite direction of the windings of the first pair of cables 62 and 64. Thus, rotation of the torsion bar 34 in one direction, clockwise as viewed from the front of the illustrated embodiment, will wind the cables onto the torsion bar. Therefore, rotation of the torsion bar 34 in one direction will pull the opposite side edges 48 and 50 of the membrane 42 toward each other to increase the tension on the membrane 42 and opposite rotation of the torsion bar 34 will decrease the tension.

The torsion bar 34 extends forwardly from the front plate 28 of the subframe beneath the front bar 22 and a suitable knob 74 is mounted thereon by which an occupant of the seat cushion 10 can adjust the membrane tension. A ratchet wheel 76 is mounted on the torsion bar 34 for rotation therewith, and the ratchet wheel 76 is disposed proximate the rear plate 24. A releasable pawl assembly 78 having pawl lever 80 is carried on the rear plate 24. The pawl assembly 78 includes a suitable bifurcated mounting bracket 82 with a pivot pin 84 being carried thereby so as to extend between the arms of the bracket. The pawl lever 80 is an elongated strap-like member of undulating configuration having a ratchet wheel engaging end 86 and an opposite end 88. The intermediate portion of the pawl lever 80 is disposed between the pivot pin 84 and the rear plate 24 with the pivot pin acting like a fulcrum about which the pawl lever is pivotably movable between a normal ratchet wheel engaging position and a released disengaging position. A suitable compression spring 90 is interposed between the rear plate 24 and the opposite end of the pawl lever to bias the lever into its normal ratchet wheel engaging position as shown in FIG. 3.

When the pawl assembly 78 is in its normal ratchet wheel engaging position, the torsion bar 34 can be rotated in a direction (clockwise) for increasing the tension on the membrane 42 in the manner hereinbefore described, but the torsion bar is latched, e.g. cannot be rotated in the opposite direction, due to the pawl lever catching in the ratchet teeth of the wheel 76. Movement of the opposite end 88 of the pawl lever 80 in a direction toward the rear plate 24 against the spring bias will move the pawl lever 80 to its released position wherein the ratchet wheel engaging end 86 of the pawl lever 80 is moved out of latched engagement with the teeth of the ratchet wheel thus releasing any previously applied tension on the membrane 42.

In view of the foregoing, it will be seen that an occupant can adjust the tension on the membrane 42 to raise it and his or her posterior relative to the plane P and in doing so will allow the membrane to conform to the occupant's posterior in a position above the plane P and thus out of engagement with the seat pan 14 upon which the seat cushion 10 is supported. This results in a comfortable well ventilated seat for the occupant and such results can be achieved for any occupant regardless of physical body characteristics by simply applying more or less tension on the membrane.

The seat cushion 10 also includes a vertical displacement limiting means which interacts with the hereinbefore described adjustable tensioning means to limit the vertical displacement of the membrane 42, and the occupant's posterior, to a safe predetermined distance above the plane P. The vertical displacement limiting means includes a proximity sensor in the form of a resiliently deformable plate 92 which is interposed between the membrane 42 and the plane P. The flexible resilient plate 92, which is preferably perforated as seen best in FIG. 3, is of substantially rectangular configuration and has its front edge 94 attached such as by rivets to the rearwardly extending flange 96 of a bracket 97 which is suitably attached to the front plate 28. The rearwardly disposed edge 98 of the resilient plate 92 is fixedly attached such as by rivets to a pivotably movable lever of a mounting means in the form of one of the leaf plates 100 of a hinge 102. The other leaf plate 104 of the hinge 102 is affixed to the rear plate 24 of the frame. A thin pad or foam material or the like may be mounted on the upper surface of the resiliently flexible plate 92. When the plate 92 is in its normal position as shown in solid lines in FIG. 2, it will be elevated a considerable distance above the plane P and the leaf plate lever 100 of the hinge 102 will be in depressing engagement with the opposite end 88 of the pawl lever 80. When depressed in this manner, the pawl lever 80 will be out of engagement with the ratchet wheel 76 thus releasing all tension from the membrane 42.

The membrane 42 is mounted on the frame with a preloaded tension selected so that when an occupant sits on the seat cushion 10, the membrane 42 will be deflected downwardly onto the resiliently flexible plate 92 which is in turn deflected downwardly to the plane P, i.e., bears against the rigid seat pan 14. Such downward deflection of the plate 92 will pivotably move the leaf plate lever 100 about its pivot axis and thus move it out of depressing engagement with the pawl assembly 78.

When an occupant causes the membrane 42 and the flexibly resilient plate 92 to be deflected downwardly into resting engagement with the seat pan 14, this position is the safest insofar as spinal damaging impacting of the occupant's buttocks by the seat pan in the event of rapid vertical acceleration or deceleration. However, such a position is very uncomfortable except for very brief periods of time. For this reason, the occupant applies tension on the membrane in the manner discussed above to raise the membrane 42 above the plane P. The inherent resiliency of the plate 92 will cause it to move upwardly with the membrane 42 and thus it too will also be elevated relative to the plane P. Such elevation will provide the desired comfort but the elevation must be limited to a predetermined amount as indicated at dimension A in FIG. 2. Any attempt of the occupant to raise the membrane 42 and the plate 92 beyond dimension A will bring the leaf plate lever 100 into releasing engagement with the pawl assembly 78. And, this will release the torsion bar 34 causing it in turn to release the tension on the membrane 42 whereupon the membrane 42, plate 92 and the occupant's posterior will move back down into resting engagement with the rigid seat pan 14, whereupon the occupant will have to start over again by applying tension to the membrane. Also, whenever an occupant gets up out of the seat cushion, the resiliently flexible plate 92 will raise itself to its normal position and thereby automatically release any previously applied tension on the membrane and thus ready the seat cushion 10 for adjustment by the next occupant.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles.

For example, the seat cushion 10 of the present invention is shown as being separate from the seat structure 12, but it will be appreciated that it could very well be fabricated as an integral part of the seat structure.

The appended claims are therefore intended to cover and embrace any such modifications within the limits only of the true spirit and scope of the invention.

What I claim is:

1. A bottom cushion for use in a seat of the type used when rapid vertical acceleration or deceleration could occur, said seat having a rigid seat pan, said seat cushion comprising:
   (a) a frame defining an opening;
   (b) subframe means below said frame and defining a plane below said frame which is coextensive with the seat pan of the seat when said bottom cushion is used therein;
   (c) a flexible membrane mounted in said frame to span the opening thereof and having a preloaded tension so that it will be deflected downwardly toward the plane of said subframe when an occupant sits on said bottom cushion;
   (d) adjustable tensioning means mounted in said subframe and connected to said membrane, said tensioning means having a latched state wherein it is operable for adjustably increasing the tension on said membrane to vertically and upwardly displace said membrane relative to the plane of said subframe and having a released state wherein any tension applied to said membrane by said tensioning means is removed; and
   (e) vertical displacement limiting means mounted in said subframe and interacting with said membrane and said tensioning means for placing said tensioning means in its latched state when said membrane is below a predetermined distance above the plane of said subframe and for placing said tensioning means in its release state when said membrane is above said predetermined distance.

2. A bottom cushion as claimed in claim 1 wherein said frame is of substantially rectangular configuration and has a rear bar, an opposed pair of side bars and a downwardly offset front bar.

3. A bottom cushion as claimed in claim 2 and further comprising a bolster extending upwardly from intermediate the opposite ends of said front bar for supporting a portion of said membrane which is proximate said front bar in an elevated position relative to said front bar.

4. A bottom cushion as claimed in claim 2 wherein said subframe means comprises:
   (a) a rear plate depending from said rear bar of said frame;
   (b) a front plate extending transversely between said pair of side bars of said frame and depending therefrom, said front plate being set back from said front bar toward the rear bar of said frame; and
   (c) said rear and said front plates serving as supporting stands for said bottom cushion and each having a linear bottom edge which cooperatively define the plane of said subframe means.

5. A bottom cushion as claimed in claim 1 wherein said membrane is of substantially rectangular configuration and has at least one edge which is free.

6. A bottom cushion as claimed in claim 5 wherein said tensioning means comprises:
   (a) a torsion bar rotatably mounted in said subframe means;
   (b) at least one cable having one end attached to said torsion bar and wound therearound with its opposite end being coupled to said free edge of said membrane;
   (c) ratchet wheel means mounted on said torsion bar for rotation therewith;
   (d) pawl means pivotably mounted on said subframe means for movement between a first position of engaging said ratchet wheel means to provide the latched state of said tensioning means and a second position of being out of engagement with said ratchet wheel means to provide the released state of said tensioning means; and
   (e) biasing means for yieldably urging said pawl means to its first position.

7. A bottom cushion as claimed in claim 6 wherein said vertical displacement limiting means comprises:
   (a) a resiliently deflectable proximity sensor plate having one edge fixedly attached to said subframe means and having an opposite edge;
   (b) mounting means on said subframe means proximate said pawl means and defining a pivot axis, said mounting means having a lever which is attached to the opposite edge of said sensor plate and is pivotably movable into and out of engagement with said pawl means; and (c) said sensor plate being interposed between said membrane and the plane defined by said subframe means, said sensor plate being movable with said membrane to move the lever of said mounting means into its second position when said membrane is above said predetermined distance above the plane of said subframe means and out of engagement with said pawl means to allow said biasing means to move said pawl means to its first position when said membrane is below said predetermined distance above the plane defined by said subframe means.

8. A bottom cushion as claimed in claim 7 wherein said resiliently deflectable sensor plate is of substantially rectangular configuration and has a thin cushion pad thereon.

9. A bottom cushion as claimed in claim 2 wherein membrane is of substantially rectangular configuration and comprises:

(a) a rear edge which is looped over and fixedly attached to said rear bar of said frame;
(b) a front edge which is looped over and fixedly attached to said front bar of said frame;
(c) a first side edge which is looped over a first one of said opposed pair of side bars of said frame, said first edge being elongated and free of attachment to said frame; and
(d) a second side edge which is looped over a second one of said opposed pair of side bars of said frame, said second edge being elongated and free of attachment to said frame.

10. A bottom cushion as claimed in claim 9 wherein said membrane is air-permeable.

11. A bottom cushion as claimed in claim 9 wherein said membrane is formed of a net-like material.

12. A bottom cushion as claimed in claim 9 and further comprising:

(a) a first elongated rod connected to the first side edge of said membrane for rigidification thereof; and
(b) a second elongated rod connected to the second side edge of said membrane for rigidification thereof.

13. A bottom cushion as claimed in claim 12 wherein said tensioning means comprises:

(a) an elongated torsion bar rotatably mounted in said subframe means;
(b) a first pair of cables each having one end attached to said torsion bar and wound therearound, said first pair of cables each having an opposite end which is connected to a different one of the opposite ends of said first elongated rod;
(c) a second pair of cables each having one end attached to said torsion bar and wound around said torsion bar in a direction which is opposite to the winding of said first pair of cables, said second pair of cables each having an opposite end which is connected to a different one of the opposite ends of said second elongated rod;
(d) ratchet wheel means mounted on said torsion bar for rotation therewith;
(e) pawl means pivotably mounted on said subframe means for movement between a first position of engaging said ratchet wheel means to provide the latched state of said tensioning means and a second position of being out of engagement with said ratchet wheel means to provide the release state of said tensioning means; and
(f) biasing means for yieldably urging said pawl means to its first position.

14. A seating system for use whenever rapid vertical acceleration or deceleration could occur, said seating system comprising:

(a) a seat structure having a rigid seat pan;
(b) an open frame mounted in said seat structure in elevated relationship relative to the pan of said seat;
(c) a flexible membrane mounted on said frame with a preloaded tension so that said membrane will be deflected downwardly toward the pan of said seat when an occupant sits on said membrane;
(d) adjustable tensioning means interposed between said frame and the pan of said seat and connected to said membrane, said tensioning means having a latched state wherein it is operable for adjustably increasing the tension on said membrane to vertically and upwardly displace said membrane relative to the pan of said seat and having a released state wherein any tension applied to said membrane by said tensioning means is removed; and
(e) vertical displacement limiting means interposed between said membrane and the pan of said seat and interacting with said membrane and said tensioning means for placing said tensioning means in it's latched state when said membrane is below a predetermined distance above the pan of said seat and for placing said tensioning means in its released state when said membrane is above said predetermined distance.

15. A seating system as claimed in claim 14 wherein said membrane has at least one free edge.

16. A seating system as claimed in claim 15 wherein said tensioning means comprises:

(a) a torsion bar mounted for rotation below said frame;
(b) at least one cable having one end attached to said torsion bar and wound therearound and having a distal end which is coupled to the free edge of said membrane;
(c) ratchet wheel means mounted on said torsion bar for rotation therewith;
(d) pawl means adjacent said ratchet wheel means for movement between a first position of engaging said ratchet wheel means to provide the latched state of said tensioning means and a second position of being out of engagement with said ratchet wheel means to provide the release state of said tensioning means; and
(e) biasing means for yieldably urging said pawl means to it's first position.

17. A seating system as claimed in claim 16 wherein said vertical displacement limiting means comprises:

(a) a resiliently deflectable proximity sensor plate having one edge fixedly attached below said frame and having an opposite edge;
(b) mounting means proximate said pawl means and defining a pivot axis, said mounting means having a lever which is attached to the opposite edge of said sensor plate and is pivotably movable into and out of engagement with said pawl means; and
(c) said sensor plate being interposed between said membrane and the pan of said seat, said sensor plate being movable with said membrane to move the lever of said mounting means into it's second position when said membrane is above said predetermined distance above the pan of said seat and out of engagement with said pawl means to allow said biasing means to move said pawl means to it's first position when said membrane is below said predetermined distance above the pan of said seat.

18. A seating system as claimed in claim 17 wherein said resiliently deflectable sensor plate is of substantially rectangular configuration and has a thin cushion pad thereon.

19. A seating system as claimed in claim 14 and further comprising:
  (a) said frame being of substantially rectangular configuration and including,
    I. a rear bar,
    II. an opposed pair of side bars,
    III. a downwardly offset front bar;
  (b) said membrane being of an air-permeable material and having a substantially rectangular configuration and including,
    I. a rear edge looped over and attached to said rear bar,
    II. a front edge looped over and attached to said front bar,
    III. a first side edge looped over a first one of said opposed pair of side bars, said first side edge being elongated and free of attachment to said frame,
    IV. a second side edge looped over a second one of said opposed pair of side bars, said second side edge being elongated and free of attachment to said frame;
  (c) a first elongated rod connected to said first side edge for rigidification thereof; and
  (d) a second elongated rod connected to said second side edge for rigidification thereof.

20. A seating system as claimed in claim 19 wherein said tensioning means comprises:
  (a) an elongated torsion bar rotatably mounted below said frame;
  (b) a first pair of cables each having one end attached to said torsion bar and wound therearound, said first pair of cables each having an opposite end which is connected to a different one of the opposite ends of said first elongated rod;
  (c) a second pair of cables each having one end attached to said torsion bar and wound around said torsion bar in a direction which is opposite to the winding of said first pair of cables, said second pair of cables each having an opposite end which is connected to a different one of the opposite ends of said second elongated rod;
  (d) ratchet wheel means mounted on said torsion bar for rotation therewith;
  (e) pawl means pivotably mounted below said frame for movement between a first position of engaging said ratchet wheel means to provide the latched state of said tensioning means and a second position of being out of engagement with said ratchet wheel means to provide the release state of said tensioning means; and
  (f) biasing means for yieldably urging said pawl means to its first position.

* * * * *